Patented Feb. 13, 1945

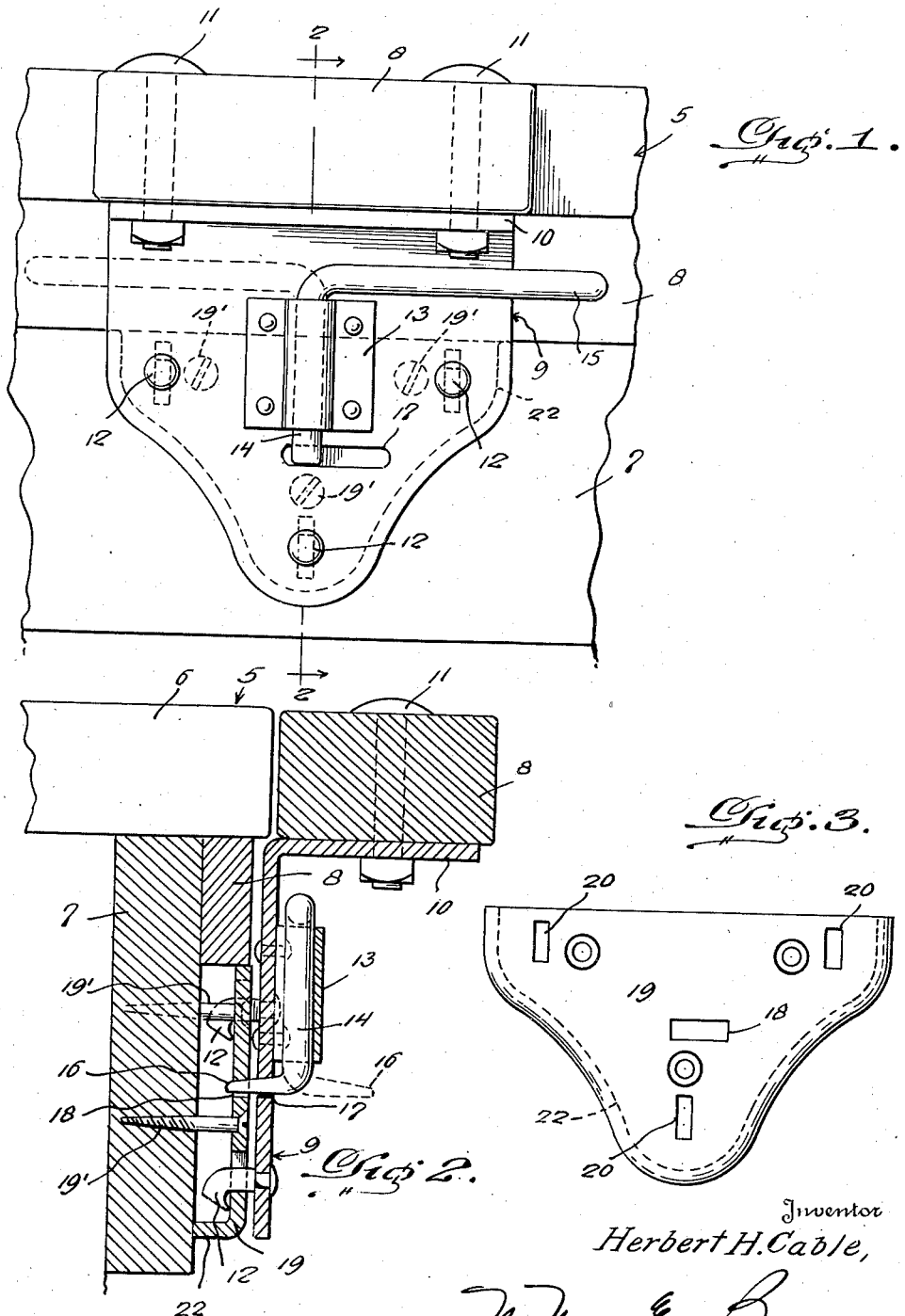

2,369,336

UNITED STATES PATENT OFFICE 2,369,336

KITCHEN UTILITY MOUNTING

Herbert H. Cable, Van Nuys, Calif.

Application December 23, 1943, Serial No. 515,453

2 Claims. (Cl. 248—235)

This invention relates to a kitchen utility mounting and more particularly to a bracket for arranging the mounting in an operative position on a kitchen sink, table or similar device for the support of a meat grinder, or some other similar device which may be used in the preparation of foods.

The primary object of this invention is the provision of a bracket for the mounting which will permit easy and quick application and removal thereof and will arrange the mounting horizontally and flush with the top surface of the table or sink when applied thereto.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a front elevation illustrating a kitchen utility mounting applied to a kitchen sink by a bracket constructed in accordance with my invention.

Figure 2 is a transverse sectional view taken on the line 2—2 of Figure 1.

Figure 3 is a front elevation illustrating one section of the bracket and which is permanently attached to a wall of the kitchen sink.

Referring in detail to the drawing, the numeral 5 indicates a fragmentary portion of a kitchen sink, the top thereof being indicated by the character 6. One of the vertical walls of the sink is illustrated, as at 7. The top wall 6 projects or overhangs the vertical wall 7 in the usual construction of a sink and a fill-in strip 8 for decorative purposes is applied directly under the overhang of the top wall and onto the vertical wall 7 of the sink.

Quite frequently it is desired to use the sink as a support for kitchen accessories, such as a meat grinder or the like, and in order that the accessory may be easily applied to the sink without damage to the latter a mounting or block 8 is provided. This block or mounting is of such a size and shape to permit the usual clamp of the kitchen accessory to be conveniently applied thereto.

The mounting 8 when in use must be firmly supported on the sink and in order to accomplish this a bracket 9 constructed in accordance with the present invention is employed. This bracket will permit the mounting 8 to be easily removed from the sink when not in use and reapplied thereto whenever desired.

The bracket 9 includes a substantially L shaped plate 10, one portion of which is secured to the block or mounting 8 by bolts 11 and the other portion has secured thereto a plurality of hook shaped elements 12 and a sleeve 13 which rotatably supports a shaft 14 including a handle 15 and a right angularly disposed extension 16. The shaft is rotatable in the sleeve for moving the extension 16 into a slot 17 and also into a slot 18 of a keeper plate 19 forming a part of the clamp.

The keeper plate 19 is mounted on the vertical wall 7 by screws or like fasteners 19' and is provided with slots 20 to receive the hook-shaped elements 12 and also has a slot 18.

Marginal flanges 22 are formed on the plate 19 and space the latter a limited distance away from the vertical wall 7 and flush with the outer face of the strip 8 of the sink so that when the L shaped plate is applied thereto it will be positioned to arrange the mounting or block with its top face flush with the top face of the top wall 6 of the sink.

In adapting the L shaped plate to the keeper plate, the hook shaped elements pass through the slots 20 and engage with the inner face of the keeper plate. To prevent the hook shaped elements from being raised upwardly and withdrawn from the slots, the extension 16 of the shaft is moved to extend through the slots 17 and 18. The L shaped plate thus secured to the sink will firmly support the mounting or block 8 to withstand excessive strains. To remove the mounting or block 8 from the sink it is only necessary to disengage the extension 16 from the slots 17 and 18 and raise upwardly on the L shaped plate to withdraw the hook shaped elements from the keeper plate.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a device of the character described, a keeper plate including flanges on one face thereof to abut a vertical wall of a support, said flanges spacing the plate from the wall fasteners securing the keeper plate to the wall, said keeper plate having vertical and horizontal slots, an L shaped plate having one portion thereof paralleling the keeper plate and its other portion disposed horizontally, downturned hook shaped lugs secured to the L shaped plate to enter the vertical slots of the keeper plate and retained therein by gravitation, a mounting block carried by the horizontal portion of the L shaped plate, and a vertical shaft rotatably mounted on the L shaped plate and having an angular end portion adapted to enter said horizontal slot of the keeper plate to prevent the hook shaped lugs from moving vertically out of the other slots of said keeper plate.

2. In a device of the character described, a keeper plate including flanges on one face thereof to abut a vertical wall of a support, said flanges spacing the plate from the wall fasteners securing the keeper plate to the wall, said keeper plate having vertical and horizontal slots, an L shaped plate having one portion thereof paralleling the keeper plate and its other portion disposed horizontally, downturned hook shaped lugs secured to the L shaped plate to enter the vertical slots of the keeper plate and retained therein by gravitation, a mounting block carried by the horizontal portion of the L shaped plate, a shaft journaled vertically on the L shaped plate including a handle at its upper end and a right angularly disposed lower end portion, said L shaped plate having a horizontal slot paralleling the horizontal slot of the keeper plate, said shaft adapted to be rotated to extend the extension through the slot of the L shaped plate and the horizontal slot of the keeper plate to prevent the hook shaped elements from moving upwardly and outwardly of the other slots of the keeper plate.

HERBERT H. CABLE.